(12) United States Patent
Filipowicz et al.

(10) Patent No.: US 10,365,441 B2
(45) Date of Patent: Jul. 30, 2019

(54) MONOLITHIC TWO-DIMENSIONAL OPTICAL FIBER ARRAY

(71) Applicant: II-VI Incorporated, Saxonburg, PA (US)

(72) Inventors: Mark Filipowicz, Scotts Valley, CA (US); Mark H. Garrett, Morgan Hill, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 0 days.

(21) Appl. No.: 15/813,432

(22) Filed: Nov. 15, 2017

(65) Prior Publication Data

US 2018/0074266 A1    Mar. 15, 2018

Related U.S. Application Data

(63) Continuation of application No. 15/011,370, filed on Jan. 29, 2016, now Pat. No. 9,846,280.

(51) Int. Cl.
*G02B 6/36* (2006.01)
*G02B 6/35* (2006.01)

(52) U.S. Cl.
CPC ......... *G02B 6/3644* (2013.01); *G02B 6/3668* (2013.01); *G02B 6/3672* (2013.01); *G02B 6/3692* (2013.01); *G02B 6/3518* (2013.01); *G02B 6/3556* (2013.01)

(58) Field of Classification Search
None
See application file for complete search history.

(56) References Cited

U.S. PATENT DOCUMENTS

| | | | |
|---|---|---|---|
| 5,394,498 A * | 2/1995 | Hinterlong | G02B 6/3672 264/1.1 |
| 6,766,086 B1 | 7/2004 | Sherman | |
| 6,773,166 B2 | 8/2004 | Trezza | |
| 6,823,127 B2 | 11/2004 | Nasiri | |
| 6,950,570 B1 * | 9/2005 | Novotny | G02B 6/3588 385/16 |
| 7,606,454 B2 | 10/2009 | Furusawa | |

(Continued)

FOREIGN PATENT DOCUMENTS

WO    WO 02/097500    12/2002

*Primary Examiner* — Michael Stahl
(74) *Attorney, Agent, or Firm* — Wendy W. Koba

(57) ABSTRACT

A two-dimensional (2D) optical fiber array component takes the form of a (relatively inexpensive) fiber guide block that is mated with a precision output element. The guide block and output element are both formed to include a 2D array of through-holes that exhibit a predetermined pitch. The holes formed in the guide block are relatively larger than those in precision output element. A loading tool is used to hold a 1×N array of fibers in a fixed position that exhibits the desired pitch. The loaded tool (holding the pre-aligned 1×N array of fibers) is then inserted through the aligned combination of the guide block and output element, and the fiber array is bonded to the guide block. The tool is then removed, re-loaded, and the process continued until all of the 1×N fiber arrays are in place. By virtue of using a precision tool to load the fibers, the guide block does not have to be formed to exhibit precise through-hole dimensions, allowing for a relatively inexpensive guide block to be used.

10 Claims, 11 Drawing Sheets

(56) References Cited

U.S. PATENT DOCUMENTS

| | | | |
|---|---|---|---|
| 9,726,824 B1* | 8/2017 | Berger | G02B 6/3512 |
| 2002/0122654 A1 | 9/2002 | Bruns | |
| 2002/0154882 A1* | 10/2002 | Moran | G02B 6/362 |
| | | | 385/137 |
| 2002/0159729 A1* | 10/2002 | DiMascio | G02B 6/3839 |
| | | | 385/120 |
| 2002/0197047 A1* | 12/2002 | Basavanhally | G02B 6/3644 |
| | | | 385/137 |
| 2003/0123810 A1 | 7/2003 | Yang | |
| 2003/0202768 A1* | 10/2003 | Nasiri | G02B 6/3664 |
| | | | 385/137 |

* cited by examiner

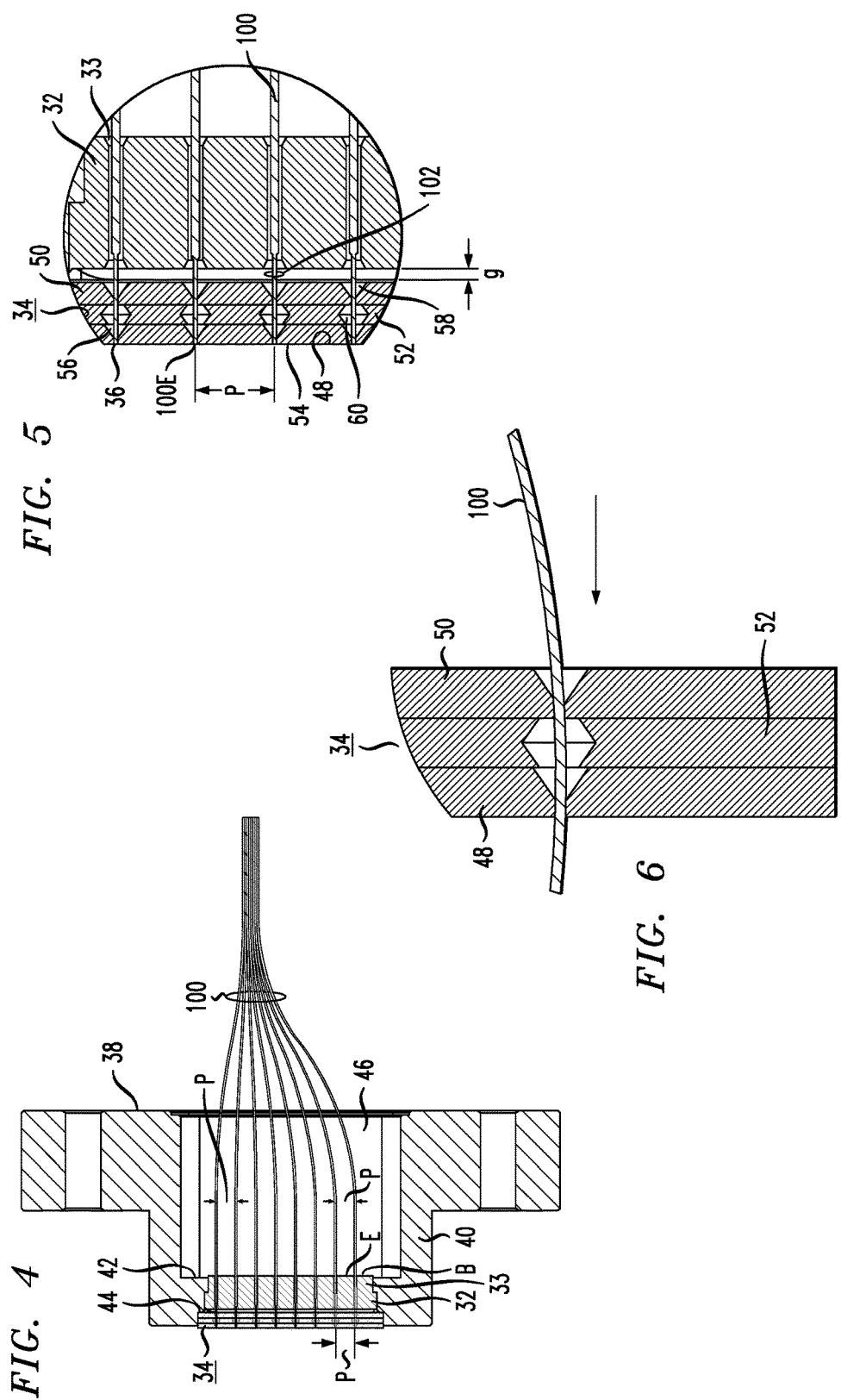

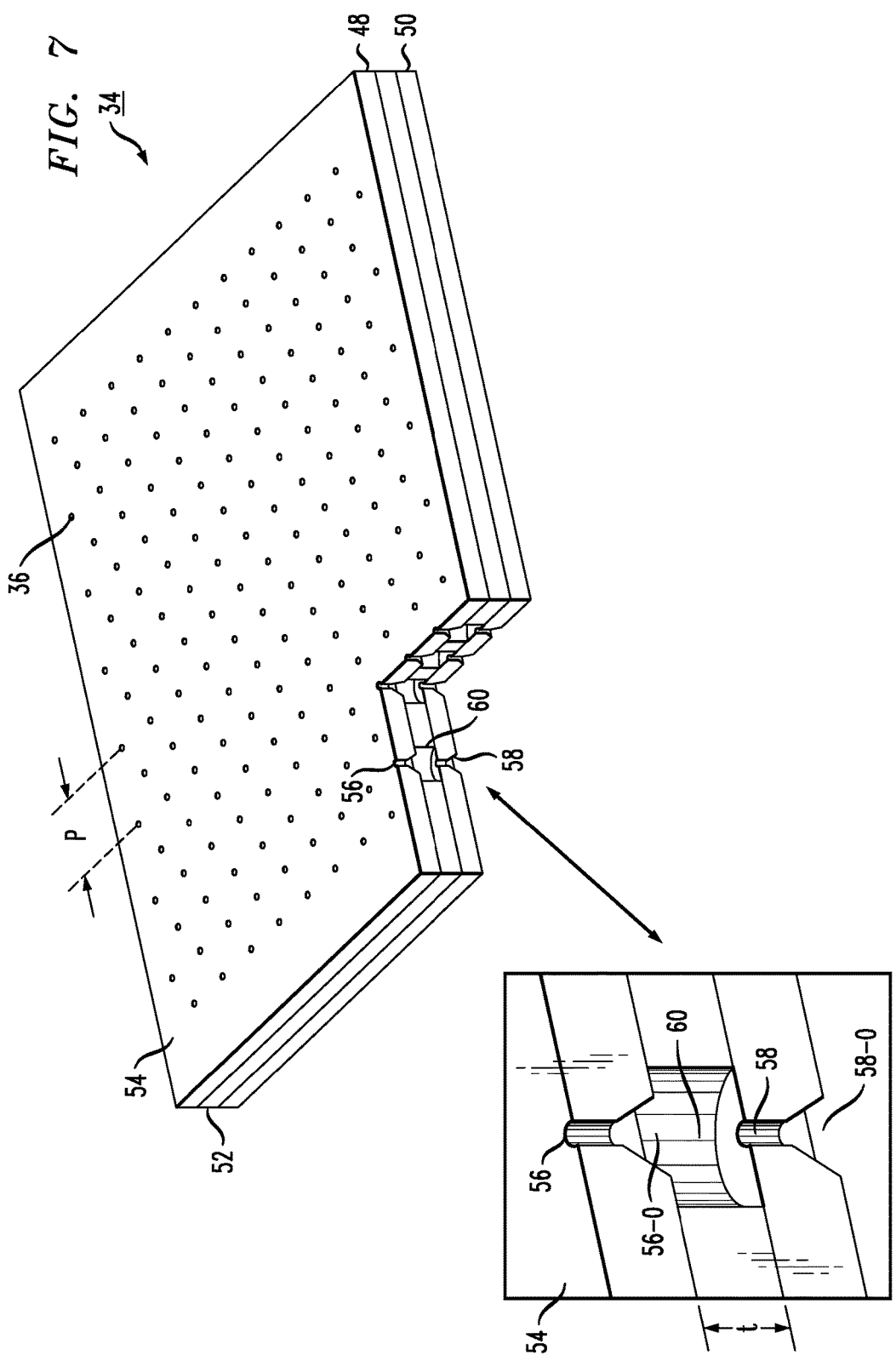

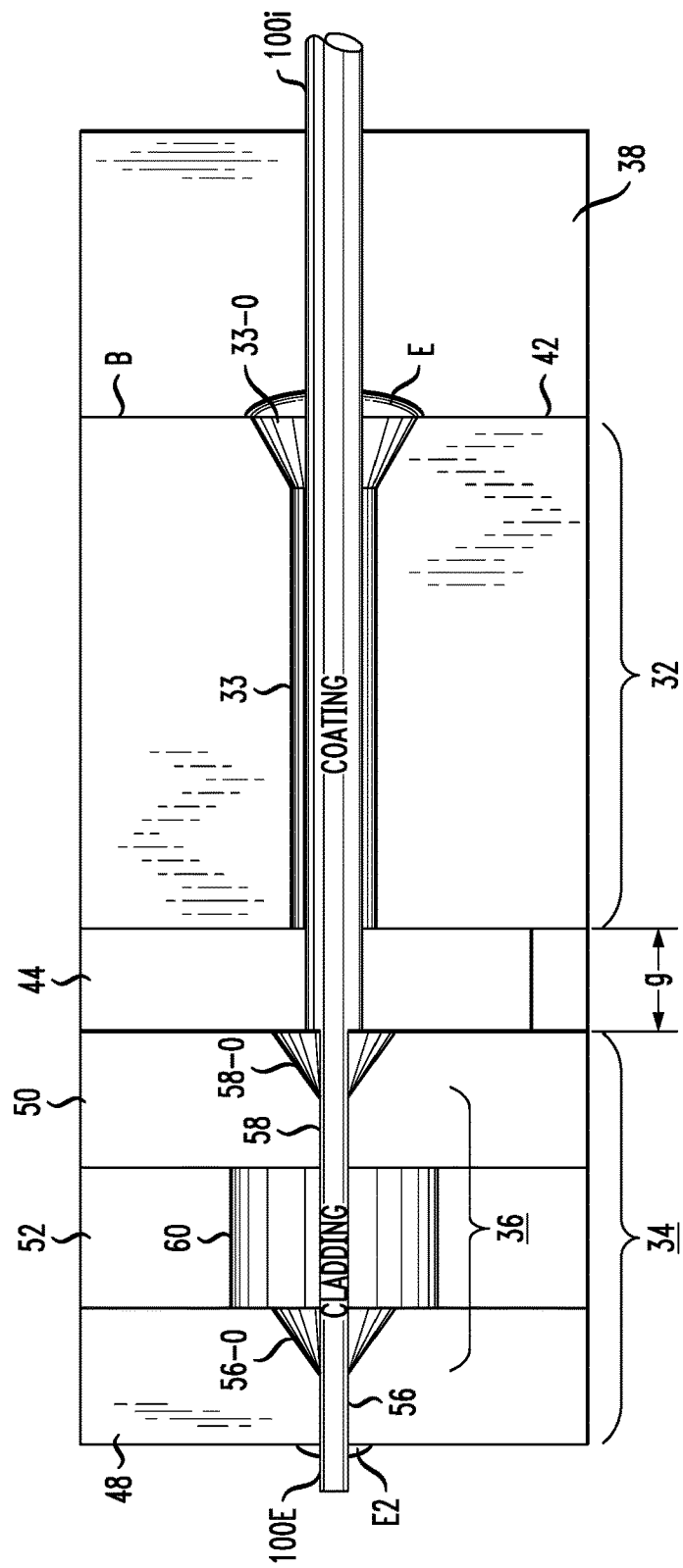

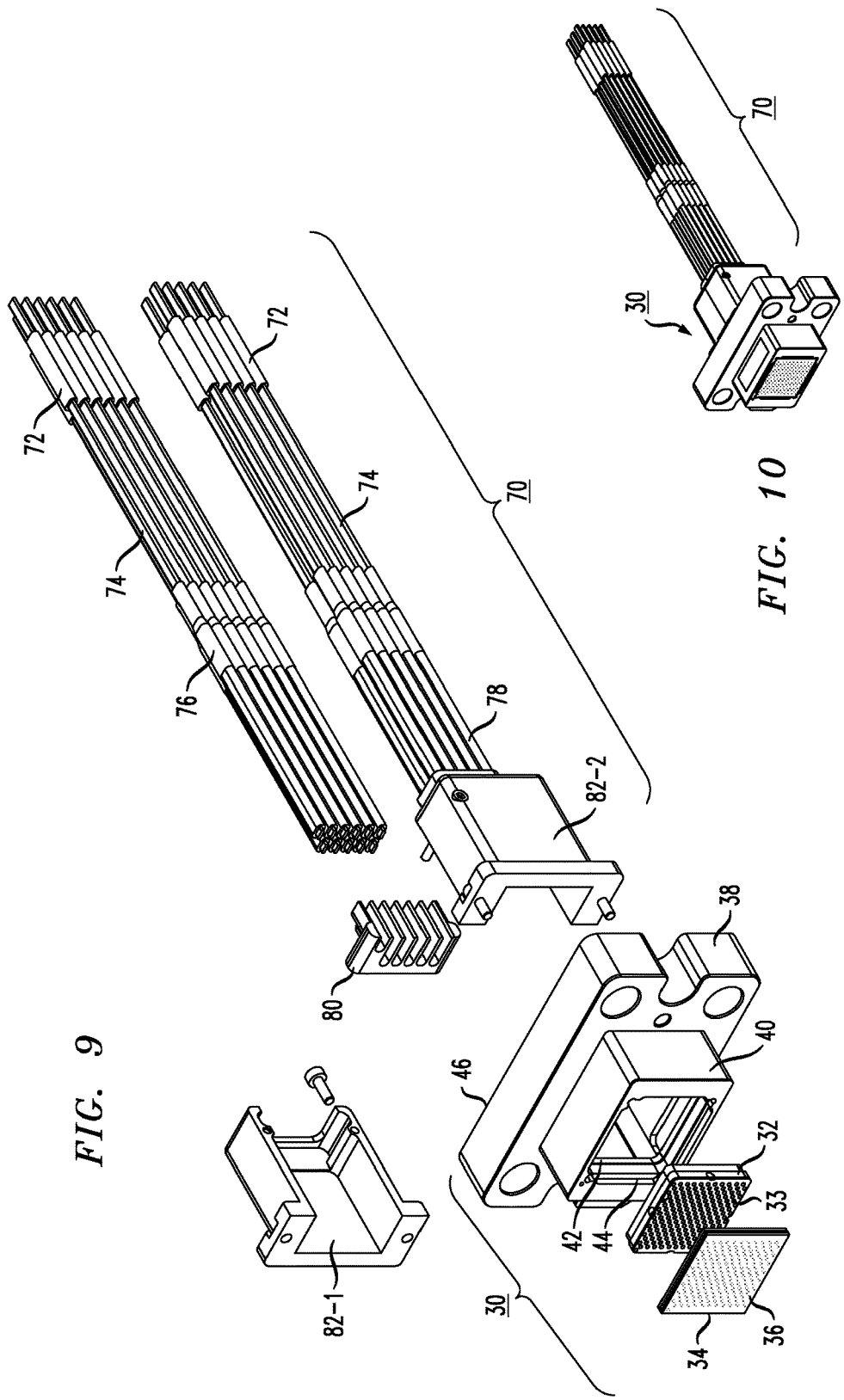

MONOLITHIC TWO-DIMENSIONAL OPTICAL FIBER ARRAY

CROSS-REFERENCE TO RELATED APPLICATIONS

This application is a continuation of U.S. patent application Ser. No. 15/011,370, filed Jan. 29, 2016 and herein incorporated by reference.

TECHNICAL FIELD

The present is vention relates to a two-dimensional optical fiber array component and a method for constructing an array component in a manner that provides the required alignment tolerances while minimizing component cost and reducing the assembly complexity.

BACKGROUND

Optical communication systems, particularly those associated with telecommunications and data center applications, face an ever-increasing need for larger optical switching configurations, such as optical cross-connects and "fiber-to-free-space" switching fabrics. The interconnectivity of devices via Internet-based cloud computing, as well as cloud storage capabilities, has raised the demand for lower cost optical communication systems that are able to easily and quickly switch signal paths.

Optical routing of one path of an N×N array of input ports to any other output port of an N×N array of outputs will be further enabled by the development of a readily producible two-dimensional (2D) fiber array component that is available for a relatively low cost. In such free-spacing routing paradigms, an N×N fiber array is disposed at the back focal plane of an N×N lens array, which produces beams with their minimum waist between the communicating arrays. The routing function is enabled, for example, by a pair of properly-placed, two-dimensional MEMS arrays that allows any input to be switched to any output. FIG. 1 illustrates an exemplary structure for providing this function. Note that the optical arrangement is typically a conjugate imaging system so that a position error of the fiber at the input will be beam position error at the output fiber. Very small changes (i.e., on the order of a micron) create large insertion loss errors. This type of error is often referred to as a positional error related to variations in the center-to-center spacing between the core regions of adjacent optical fibers in the array (hereinafter referred to as "pitch").

Besides the inter-fiber spacing (pitch) inaccuracies, error in the pointing of the beam as it exits a fiber will produce a displacement of the output beam that can create coupling loss, clipping, and scattered noise problems. FIG. 2 illustrates this "pointing error" for an exemplary optical fiber 1, as positioned through an aperture 3 formed in a substrate 4. As shown, optical fiber 1 passes through aperture 3 in an off-axis manner, creating an angular amount of fiber tilt ($\theta$), measured with respect to a normal of an exit surface 2. This measure $\theta$ is defined as the angular pointing error. While shown in this case as maintaining its optical axis, insertion of optical fibers through apertures may also result in the fiber experience some amount of bending, also creating angular pointing error at the output. Fiber and thus bean pointing error impinging onto a collimating lens produces an output beam that is displaced relative to the optical axis of the system. To accommodate this displacement (so as to avoid clipping, scattering, and cross-talk), the MEMS micromirrors would need to increase in size, with the undesirable effect of reducing their density or increasing the complexity of the MEMS design. Thus, problems associated with creating free-space optical cross-connections, in high volume resides with the 2D fiber array requiring a low pitch error, as well as a low pointing error. Today's applications for such a switching fabric have simultaneous requirements of a pitch error on the order of ±1 µm or less, and a pointing error on the order of ±15 mrad (or smaller).

To date, one approach to improve the 2D fiber array component is based upon the utilization of a multiple number of precisely-etched (tapered) silicon wafers, each wafer formed to include progressively smaller and more accurately aligned vias, which may require high hole aspect ratios (i.e., the ratio of the side wall straight length to the hole diameter). The cost of fabricating multiple silicon wafers with different-sized vias, and then manipulating a stack of these wafers to align the vias is prohibitive from a cost point of view (although the required, precise alignment may be achieved). Furthermore, it is more costly and difficult to produce high aspect ratios as previously described. Locating individual wafers farther from each other axially can help address pointing error issues, but increases the difficulty of assembly of such 2D arrays, and ultimately increases the cost.

In another approach, only a pair of wafers is used, where their vias are aligned and then fibers are inserted one at a time (or one 1×N fiber array at a time) and positioned to create the desired alignment. Here, the assembly time is significant and cumbersome, again resulting in an expensive process. Additionally, since each element of this configuration is a precisely made component, the final structure can be costly.

U.S. Pat. Nos. 6,470,123 and 6,766,086 are illustrative of these prior art techniques. U.S. Pat. No. 6,470,123, which issued to Sherman et al. on Oct. 22, 2002, describes a high density optical fiber array assembly and assembly method that utilizes a series of separate, stacked guide plates that form a series of fiber guide channels. The guide plates are stacked within a housing so that the bottom of one acts as a cover for the channels of another. The fiber arrays can be "tool inserted" along the channels as one group, such as a row of fibers, or manually inserted one at a time and advanced sequentially. U.S. Pat. No. 6,766,086, which issued to Sherman et al. on Jul. 20, 2004 describes an optical fiber array apparatus comprising a housing front mask having a matrix of fiber seating openings, with each opening having one or more side walls. An optical fiber extends through each opening and a tool is used to press the fiber side surface into engagement with the one or more side walls to precisely position and secure the fiber. Bonding material then fills all voids in and around the opening. In one embodiment, a clamping wafer behind the front mask moves to clamp the fibers to the front mask opening walls. In another, the front mask defines flexing arms with distal ends that clamp fibers to opening walls and in yet another elongated flexible members lie along front mask slots to clamp fibers in openings that communicate into the slots.

SUMMARY OF THE INVENTION

The needs remaining in the prior art are addressed by the present invention, which relates to a two-dimensional optical fiber array and a method for constructing an array in a manner that provides the necessary alignment requirements while minimizing component cost and reducing the assembly complexity, especially in higher N×N 2D fiber arrays.

In accordance with the present invention, a two-dimensional (2D) optical fiber array component takes the form of a monolithic fiber guide block including a 2D configuration of through-holes that mates with a precision output element of the same 2D aperture configuration. The through-holes of the fiber guide block are arranged to exhibit the predetermined pitch of the system being assembled. While having the predetermined pitch, the diameter of each individual through-holes in the fiber guide block is relatively large (i.e., slightly greater than the diameter of a coated optical fiber), simplifying the process of loading 1×N fiber arrays into the guide block. The precision output element is positioned over and aligned with respect to the fiber guide block, so that as a 1×N fiber array is loaded, the stripped end portions of the fibers will exit through the apertures at output surface of the precision output element. A loading tool is configured to hold a plurality of N separate fibers in a spaced-apart arrangement that maintains the predetermined pitch. Therefore, as a 1×N array of fibers is loaded into the array component, this precision pitch (as defined by the tool) is maintained as the fibers pass through the larger through-holes of the guide element and then through the precisely-configured apertures (also referred to as "vias") at the output element. After each 1×N fiber array is loaded, an epoxy (or similar material) is used to attach the loaded 1×N fiber array to the backside of the fiber guide. Once fixed in place, the fiber loading tool is removed and re-loaded with another plurality of N fibers and the process is repeated until the 2D array component is fully loaded with fibers.

Inasmuch as the fiber guide block does not need to exhibit the precise alignment tolerances (pitch and pointing) demanded for the final output of the 2D array structure, a relatively low-cost material and manufacturing process can be used in the fabrication of this element of the structure. For example, a plastic material may be used.

In one embodiment of the present invention, the precision output element comprises a multilayer silicon-based structure including an input silicon layer (having etched vias) and an output silicon layer (also including etched vias), with a spacer element (also of silicon) disposed between the input and output layers. The silicon spacer is used as structural support for the output structure, ensuring that the optical fibers passing through the vias do not bend or shift (which would create pointing errors). Additionally, the silicon spacer may be configured to include over-sized relief holes (when compared to the vias in the input and output layers) so that any adhesive used to affix the fibers to the output layer will pool within the silicon spacer and not further travel along the fiber. Other configurations of a multilayer silicon-based output element may include additional layers (or fewer, such as eliminating the spacer), as the case may be.

Other materials may be used in the formation of the precision output element, as long as the element exhibits a coefficient of thermal expansion (CTE) that is relatively low, allowing for the element to maintain its required pitch and pointing error requirements over a given temperature range, and in the presence of any possible environmental conditions.

An exemplary embodiment of the present invention takes the form of a two-dimensional (2D) array component for supporting a plurality of individual optical fibers in a 2D configuration exhibiting a predetermined pitch, the array component comprising a fiber guide block including a plurality of through-holes arranged in a 2D array configuration, the plurality of through-holes disposed to exhibit the predetermined pitch, each through-hole having a diameter on the order of a coated optical fiber; a precision output element including a plurality of apertures arranged in the 2D array configuration, the plurality of apertures disposed to exhibit the predetermined pitch, each aperture having a diameter on the order of a stripped optical fiber; and a mounting flange for supporting the fiber guide block and the precision output element in an aligned configuration such that a 1×N array of pre-aligned optical fibers may be inserted through a rear opening of the mounting flange and exit from the precision output element in a configuration that exhibits the predetermined pitch with a minimal pointing error.

Another embodiment of the present invention is defined as a method of assembling a two-dimensional (2D) optical fiber array component to exhibit a predetermined pitch, with a predetermined minimum pointing error, including: providing a fiber guide block that includes a plurality of through-holes disposed in the defined 2D pattern, the plurality of through-holes positioned to exhibit the predetermined pitch and each through-hole having a diameter slightly larger than a coated optical fiber; providing a precision output element that includes a plurality of apertures disposed in the defined 2D pattern, the plurality of apertures positioned to exhibit the predetermined pitch, with each aperture having a diameter on the order of a stripped optical fiber; providing a mounting flange with a sleeve opening; inserting the fiber guide block into the mounting flange sleeve opening; inserting the precision output element in the mounting flange sleeve to overly the fiber guide block in a manner such that the plurality of apertures align with the plurality of through-holes; loading a plurality of N stripped optical fibers onto a precision tool that is capable of holding the plurality of N stripped optical fibers in a 1×N array with the predetermined pitch, creating a pre-aligned 1×N array of optical fibers; inserting the precision tool through a backside opening in the mounting flange and directing the 1×N array of pre-aligned optical fibers through a 1×N array of through-holes in the fiber guide block and an aligned 1×N array of apertures in the precision output element until stripped end terminations of the plurality of N stripped optical fibers exit from the output element; attaching the inserted 1×N array of fibers to a backside of the fiber guide block to fix and maintain the desired pitch and pointing error of the loaded 1×N array; repeating the steps of loading, inserting, and attaching until an entire 2D array of optical fibers is in place; and bonding the exposed stripped end terminations of the 2D array of optical fibers to an outer surface of the output element.

Other and further aspects and embodiments of the present invention will become apparent during the course of the following discussion and by reference to the accompanying drawings.

BRIEF DESCRIPTION OF THE DRAWINGS

Referring now to the drawings,

FIG. 4 is top view of a portion of the embodiment of FIG. 3;

FIG. 5 is an enlarged view of a portion of FIG. 3;

FIG. 6 is a side view of a portion of an output element, illustrating the potential for pointing error when not implementing the features of the present invention;

FIG. 7 is an isometric view of an exemplary multilayer silicon-based version of the precision output element of the 2D fiber array component;

FIG. 8 is a cut-away side view of a portion of an exemplary embodiment of a 2D fiber array component formed in accordance with the present invention;

FIG. 9 is an exploded isometric view of an exemplary configuration of the present invention, illustrating fiber strain relief elements as used in conjunction with the 2D fiber array component;

FIG. 10 illustrates the elements of FIG. 9 in an assembled form;

DETAILED DESCRIPTION

Figure 1:
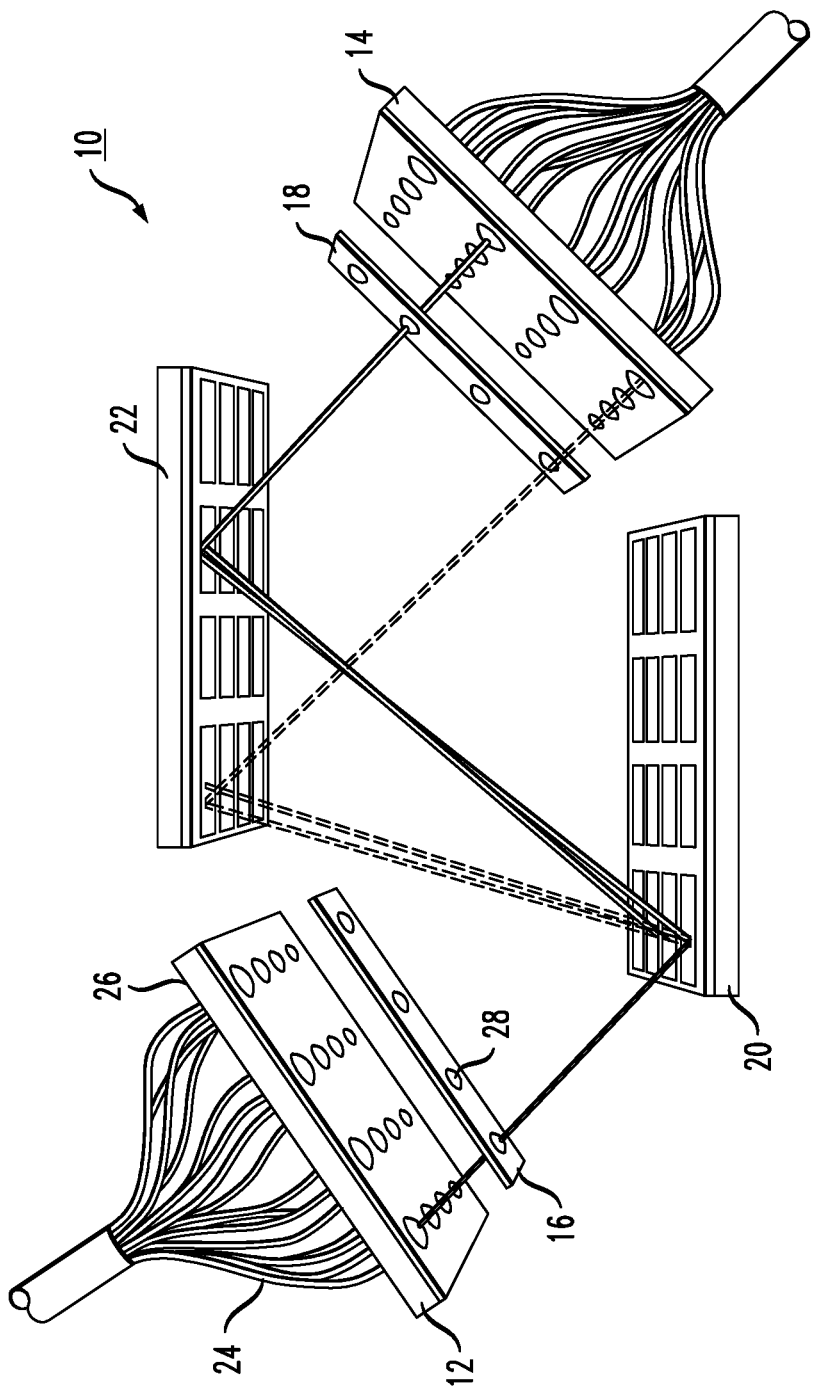
FIG. 1 illustrates an exemplary optical communications environment within which a switching fabric utilizing a two-dimensional optical fiber array may be used.
Figure 2:
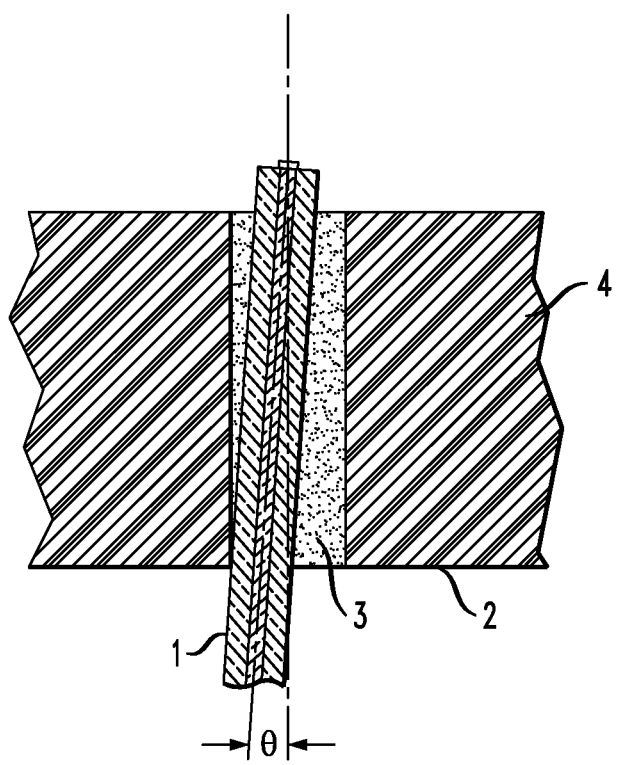
FIG. 2 is a diagram illustrating the particular details associated with pointing error.

As briefly mentioned above, FIG. 1 illustrates a typical optical communication switching system 10 that may utilize the monolithic 2D fiber array component of the present invention. As shown, switching system 10 provides "fiber-to-free-space" switching between a first 2D fiber array 12 and a second 2D fiber array 14 via associated lens arrays 16, 18 and MEMS arrays 20, 22. Each fiber array includes a plurality of individual optical fibers 24, separated by a predetermined spacing (hereinafter referred to as "pitch") and coextensive with the surface of the array to direct light beams in a direction perpendicular to the array surface (pointing, as discussed above in association with FIG. 2).

Referring to first 2D fiber array 12, fibers 24 are shown as being introduced through the back side of an array substrate 26 and distributed in an array configuration (here, a 4×4 array). Array substrate 26 is formed such that the endfaces of the inserted fibers align with a set of individual lenses 28 formed in lens array 16, providing collimated output signals that are thereafter directed toward MEMS array 20. After being re-directed through MEMS arrays 20 and 22, the signal(s) pass through lens array 18 and is/are received at second 2D fiber array 14.

The actual progress of optical signals back and forth through switching system 10 is well known in the art and is not germane to the subject matter of the present invention. As mentioned above, the present invention is directed to an improved structure and assembly for a 2D fiber array that maintains the necessary alignment with the lens arrays and MEMS arrays in a low-cost configuration. While various techniques have been developed to minimize the cost and size of the other components forming switching system 10 (e.g., MEMS array, lens array), the structures and assembly methods used to interconnect the actual optical fibers with the remaining switch components have remained expensive, labor-intensive processes.

Accordingly, the present invention provides a monolithic fiber array structure that reduces the overall size and complexity of the array component, retaining the desired alignment tolerances, pitch and pointing, while also simplifying the assembly of the configuration.

Figure 3:
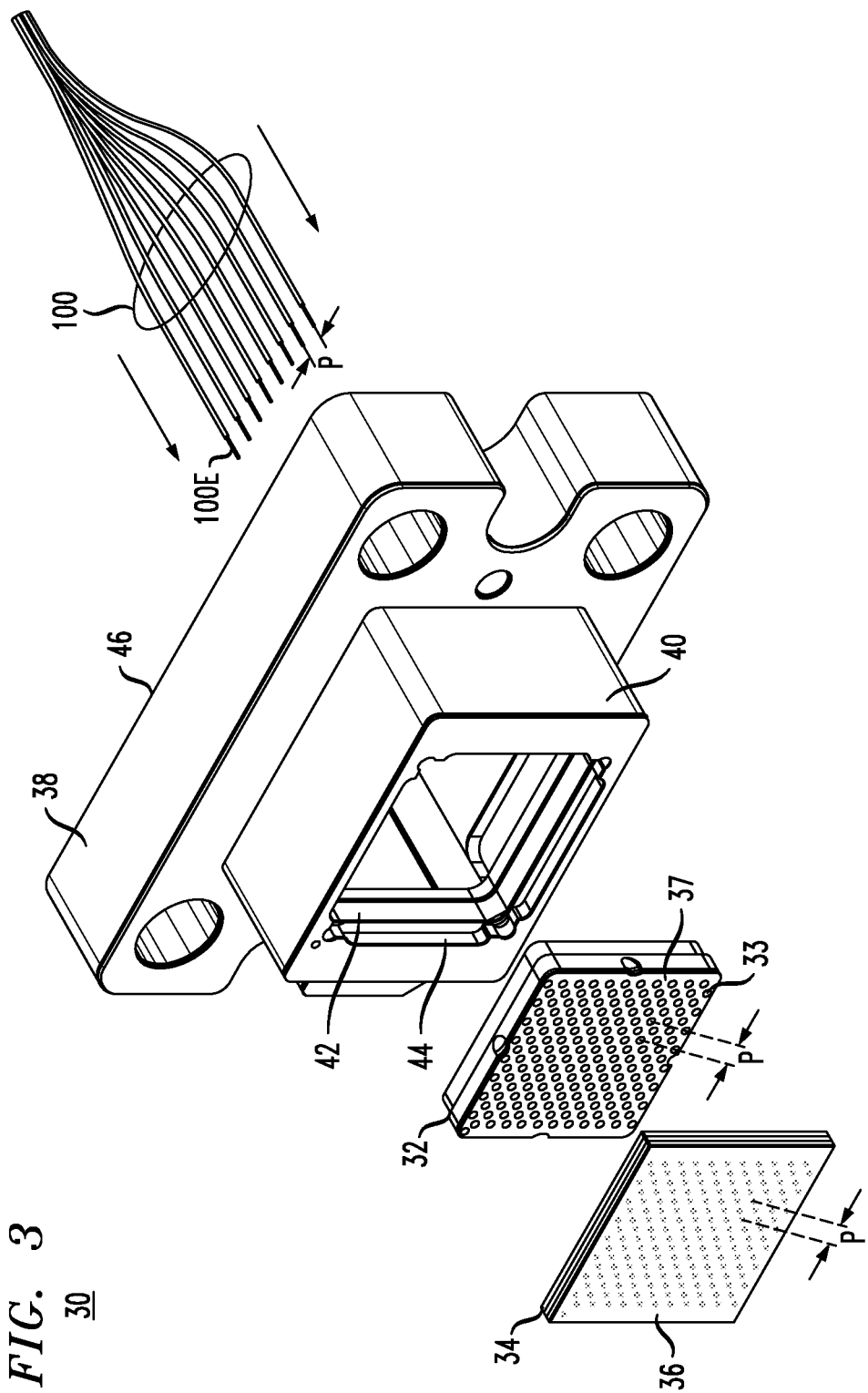
FIG. 3 is an isometric view of an exemplary 2D fiber array component formed in accordance with the present invention.

FIG. 3 is an exploded view of an exemplary 2D fiber array component 30 formed in accordance with an embodiment of the present invention. Array component 30 includes a monolithic fiber guide block 32 and a precision output element 34 that are held in an aligned configuration within a mounting flange 38. A precisely-configured tool (not shown) is used to load pre-aligned 1×N fiber arrays 100 through a rear opening 46 of mounting flange 38, with the end terminations of the fibers being thread through through-holes 33 formed in fiber guide block 32 and apertures 36 formed in precision output element 34 (through-holes 33 exhibiting the same pitch as apertures 36, but of a somewhat larger diameter). As will be discussed in detail below, apertures 36 are formed in a pre-defined 2D array pattern that creates the pitch, while minimizing pointing error.

As shown, mounting flange 38 includes a sleeve 40 with a first shoulder 42 for supporting fiber guide block 32 as it is inserted into sleeve 40. A second shoulder 44 is formed in sleeve 40 and is used to support output element 34 over guide block 32 in a spaced-apart arrangement with alignment between through-holes 33 of fiber guide block 32 and apertures 36 of output element 34. A rear opening 46 is formed in mounting flange 38 and is used to accept the 1×N array of fibers 100 as they are loaded into component 30. By virtue of presenting a pre-aligned 1×N fiber array to guide block 32 (via the precision loading tool), and maintaining the alignment as the fibers pass through output element 34, it is possible in accordance with the present invention to efficiently load precisely-aligned fiber arrays, providing improvement over prior art configurations. As each 1×N fiber array is loaded, a suitable epoxy is introduced through mounting flange 38 to affix the fibers to the backside of guide block 32.

In contrast to some prior art configurations, the majority of elements forming fiber array component 30 comprise low-cost materials and may be assembled used a relatively a low-cost manufacturing process. For example, fiber guide block 32 may be formed of a plastic material and may be injection molded, printed using 3D technology, or manufactured in any way that easily forms through-holes 33 within the plastic piecepart. Flange 38 is typically a machined stainless steel structure, with the location and dimensions of shoulders 42 and 44 controlled by the machining process. Thus, the arrangement of the present invention limits the need for relatively expensive components (and requisite expensive processing and assembly) to precision output element 34.

FIG. 4 is a cut-away top view of the exemplary fiber array component 30 of FIG. 3, with FIG. 5 being an enlarged view of a portion of the view of FIG. 4. Referring to FIG. 4, the positioning of fiber guide block 32 and precision output element 34 within sleeve 40 of mounting flange 38 is clearly shown. In accordance with the present invention, sleeve 40 is sized and configured (along with shoulders 42 and 44) such that pre-aligned 1×N arrays of fibers entering the arrangement at rear opening 46 will automatically align with apertures 36 of output element 34 pass directly through apertures 36 without the need for any other alignment processes). As will be described in detail below, by virtue of using a precision tool that pre-aligns a 1×N array of fibers to the requisite pitch, the fiber guide block does not need to exhibit a similar level of accuracy and can be formed from a lesser expensive process. The individual fibers of the 1×N array are held by the precision tool, which is used to arrange them into the proper pitch. Since the length of the stripped fibers is relatively short, the fibers can be held by the tool in a straight, parallel configuration with little pointing error at the proper pitch. With the fiber guide block and output element pre-aligned with respect to each other, the tool holding the aligned fibers can be readily guided so that the fibers are inserted into the through-holes of the guide block, and then further into the apertures of the output element without interference, for every fiber of the 1×N array of fibers. Inasmuch as the precision tool will be re-used in the assembly of multiple fiber array components, the associated expense in creating such a tool is relatively low on a per component basis.

Continuing with the description of FIGS. 4 and 5, a 1×N array of fibers 100 is shown as being loaded through rear opening 46 of mounting flange 38 (the precision tool used to maintain the predetermined pitch P between adjacent fibers not shown). The stripped end terminations 100E of fibers 100 are shown as exiting through precision output element 34. Once a 1×N fiber array is loaded, an epoxy E is applied along the backside B of fiber guide block 32 to hold the fibers in fixed, aligned position. After the epoxy is cured, the precision tool is removed and reloaded with another plurality of N fibers, again presenting a pre-aligned (with respect to the desired pitch) array of fibers for loading into array component 30.

As best seen in FIG. 5, the diameter of through-holes 33 for need fiber guide block 32 is selected to be able to accommodate coated optical fibers. The diameter of apertures 36 formed in precision output element 34 is selected to be slightly greater than the diameter of cladded optical fibers (i.e., "stripped" fibers with the coating material removed). In this particular configuration, precision output element 34 is shown as a multilayer structure, which each layer including vias that align to form apertures 36. One exemplary embodiment of a multilayer output element 34 will be discussed below in association with FIG. 7.

Referring again to FIGS. 4 and 5, fiber guide block 32 is preferably formed of a material that allows for the interior walls of through-holes 33 to be relatively smooth. In that case, as a 1×N array of fibers is loaded, the fibers pass along unimpeded as they progress through the interior of element 32. The ability to insert the fibers in a manner such that they remain "straight" assists in minimizing the pointing error of the final structure. Suitable plastic materials exhibit this capability, and are also able to tolerate thermal cycling.

FIG. 6 is a cut-away side view of a portion of an exemplary precision output element 34, shown in this case without an accompanying fiber guide block. It is evident in this illustration that the presence of even a slight bend along the length of a fiber being inserted into output element 34 results in creating an unacceptable amount of pointing error at output surface 54 of output element 34. The inclusion of a fiber guide block (aligned with output element 34), in conjunction with a precision tool that pre-aligns the fibers to the predetermined pitch, overcomes this pointing error problem and creates 2D fiber array component that fully meets (if not exceeds) the industry requirements for pitch and pointing error without requiring overly-strict and precise tolerances on the precision output element.

The existence of some pointing error in output element 34 as shown in FIG. 6 may be associated with degree of precision that is able to be fabricated within the layers forming this multilayer arrangement. It may be possible to utilize a silicon output element with deeply-etched vias in layers of sufficient thickness to achieve the pointing error tolerance. In these cases, the alignment between the fiber guide block and the output element may not need to be as well controlled. The inclusion of the fiber guide block provides further assurance of alignment and also adds to the strain relief of the final arrangement.

In one exemplary embodiment of the present invention, precision output element 34 is formed as a multilayer silicon-based element. FIG. 7 illustrates an exemplary three-layer structure including a top guiding layer 48 and a bottom guiding layer 50 (both formed of silicon), with a spacer 52 inserted between top and bottom layers 48, 50 as shown. Spacer 52 is not required by formed of silicon; any material with a similar CTE may be used. As is well-understood in the art, top and bottom silicon layers 48, 50 may be precisely etched using well-known semiconductor fabrication processes to create vias (i.e., etched, small diameter apertures) that ultimately present a 2D fiber array in a precisely-aligned configuration that meets (if not exceeds) the alignment tolerances required for optical switching systems. Outer surface 54 of top layer 48 is defined as an exit surface for a 2D fiber array component 30 utilizing this multilayer silicon-based output element embodiment of the present invention.

Referring to FIG. 7, a plurality of vias 56 is formed through top layer 48, and another plurality of vias 58 is formed through bottom layer 50. In most cases, these vias are formed using a standard etching process typical in semiconductor material processing. Layers 48 and 50 are aligned in a manner that also aligns the plurality of vias 56 with the plurality of vias 58. As will be discussed in detail below, spacer 52 is formed to include larger openings 60 (larger with respect to vias 56, 58), referred to at times hereafter as "relief openings".

In accordance with this particular embodiment of the present invention, top layer 48 is processed to create the plurality vias 56 with the accuracy required to achieve and maintain the required pitch P and pointing tolerances of the array component. As mentioned above, vias 56 are preferably formed to have a diameter only slightly larger than a cladded fiber at output surface 54. The enlarged inset view within FIG. 7 illustrates the size and spacing of an exemplary via 56, relief opening 60 and via 58 to align and form a through-hole 36 for silicon-based output element 34. In this particular arrangement, vias 56 are shown as having a larger lead-in opening 56-O to assist in the guiding of the associated fiber through the aperture. While it is possible to configure a precision output element with tapered apertures (in this case, with vias 58 slightly larger than vias 56), this is not a requirement and non-tapered apertures may also be used.

As best shown in the inset, spacer 52 is formed to include a plurality of relatively large relief openings 60. In accordance with this aspect of the present invention, relief openings 60 function to inhibit epoxy flow between top layer 48 and bottom layer 50 as the terminal portions of the fibers are fixed in place across output surface 54 of output element 34. Without these relief openings, fibers inserted through vias 56, 58 may later be subject to "piston" action and become mis-aligned. The thickness t of spacer 52 also serves as additional structural support for output component 34.

FIG. 8 is a cut-away side view of a portion of mounting flange 38 in combination with fiber guide block 32 and multilayer output element 34 as described above, clearly illustrating the alignment between the openings in the manner required to maintain pitch and minimize pointing error, while also allowing for straightforward assembly of the fibers with component 30. While shown as a three-layer component in FIG. 8, it is to be understood that precision output element 34 may be formed of any suitable number of layers. Additionally, while silicon may be a preferable material useful in forming apertures from aligned vias, materials other than silicon may be used to form the multilayer structure.

An exemplary optical fiber 100*i* is illustrated in FIG. 8 as positioned through the complete opening formed by the aligned combination of aperture 36 and through-hole 33. Stripped end termination 100E of fiber 100 is clearly shown as exiting through outer surface 54 of multilayer output element 34. As mentioned above, top silicon layer 48 of a silicon-based output element 34 is fabricated to exhibit precise alignment and dimensions for the plurality of vias 56. Spacer 52 serves two functions: (1) it forms a structural member serving to stiffen the stack so that it can be successfully polished; and (2) it forms a reservoir that prevents the epoxy used to attach the fibers to top surface 54 from wicking down to bottom layer 50. This epoxy reservoir thus eliminates the potential for fiber pistoning as a function of temperature fluctuations.

In the particular embodiment as shown in FIG. 8, vias 58 formed in bottom layer 50 are slightly larger in diameter than vias 56 formed within top layer 48. The slightly larger size of vias 58 is useful in maintaining the pre-aligned arrangement of the fibers as the loading tool (not shown) moves the fibers forward into the tighter clearance vias 56 with sufficient "straightness" (i.e., little or no "pointing"). In the particular arrangement as shown in FIG. 8, both vias 56 and 58 are formed to include larger lead-in openings (56-O and 58-O) to assist the passing the individual fibers through the structure.

In accordance with the present invention, by virtue of using a precision loading tool that presents the fibers in a pre-aligned configuration (i.e., with the desired fiber pitch), fiber guide block 32 requires less precision and therefore includes relatively large clearance through-holes 33. The addition of epoxy E (or other appropriate material) to the surface of the fibers in the vicinity of through-holes 33 at the backside B of fiber guide block 32 provides an additional measure of strain relief for the final structure. In particular, a relatively soft, compliant epoxy can be used to affix a sidewall portion of the fiber to the entrance 33-O of through-holes 33.

FIG. 9 is an exploded view of an exemplary embodiment of the present invention, in this case also illustrating various strain relief that may be used in conjunction with the inventive 2D fiber array component. The particulars of the elements forming the inventive 2D array component 30 itself are as described above. Also shown in FIG. 9 is an exemplary strain relief configuration 70. In this particular embodiment, configuration 70 includes a plurality of small shrink tubes 72, each tube disposed around a separate 1×N fiber array (in this case, in the form of a bare fiber ribbon 74). A larger shrink tube 76 is used to attach each separate ribbon 74 to an associated larger fiber tube 78. The shrink tubes are bonded to both fiber ribbon 74 and fiber guide block 32, and function to "grab" the fiber ribbon and maintain the connection to the guide block in the event that there is an attempt to pull the fiber ribbon out of the assembly.

A glue block 80 is used to secure the plurality of fiber tubes 78 in place (where only one half of glue block 80 is shown in FIG. 9). A strain-relief cover plate 82 (shown as two portions 82-1 and 82-2) is positioned to encase glue block 80 and the remaining components of strain relief arrangement 70, where the final combination is shown in position at rear opening 46 of mounting flange 38. An assembled version of this embodiment is shown in FIG. 10. By bonding the ribbons into glue block 80 and then containing those elements within cover plate 82, the ribbons are fixed in place such that handling the ribbons never pulls on the stripped fibers inside, i.e. providing "strain relief".

Figure 11:
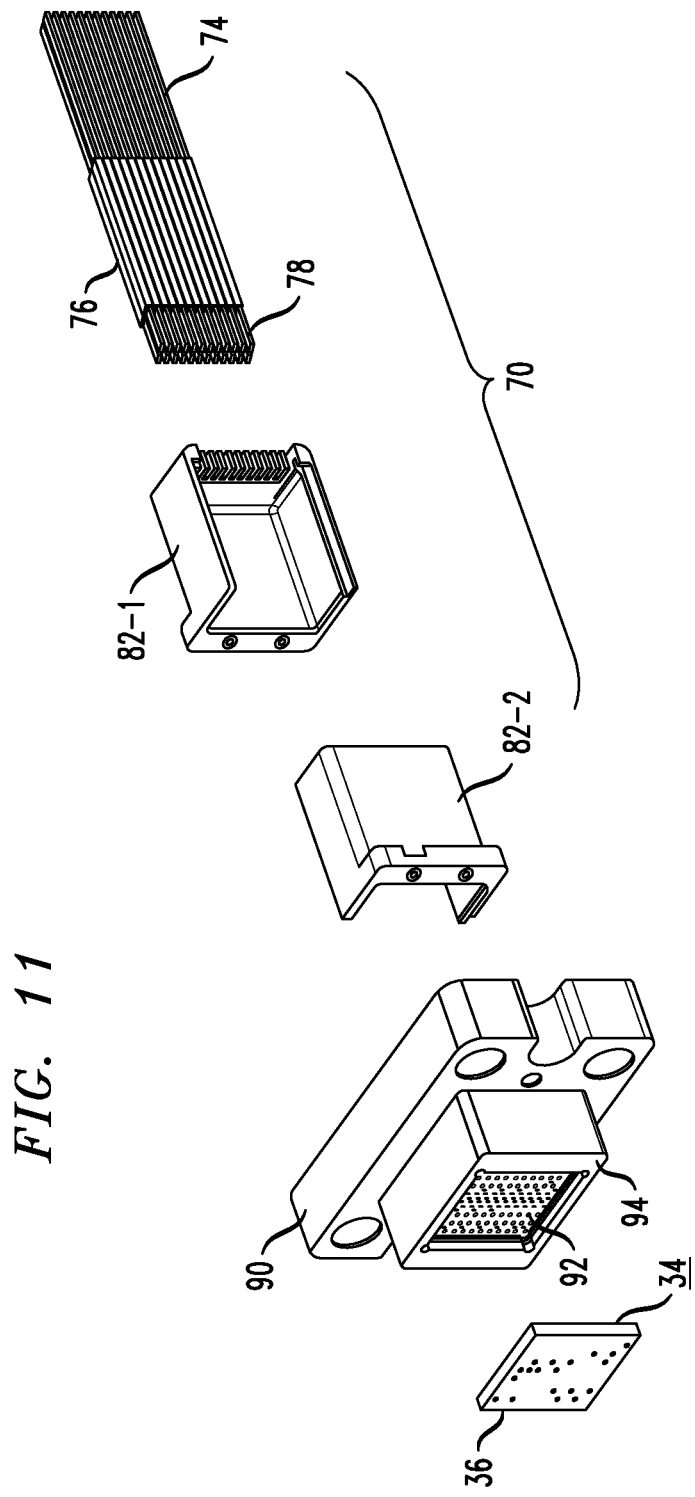
FIG. 11 contains an exploded view of an alternative embodiment of the present invention, in this case combining the fiber guide block with the mounting flange.

FIG. 11 is an exploded view of an alternative embodiment of the present invention. In this configuration, the fiber guide block of the above-described embodiment is integrated as part of a mounting flange 90 that is used to provide mechanical support for precision output element 34. Here, a plurality of through-holes 92 are directly formed (e.g., machined) in a desired 2D array pattern through a thickness of mounting flange 90 so as to exit at a top surface 94 of mounting flange 90. Similar to through-holes 33, the plurality of through-holes 92 are formed to exhibit the desired pitch P, while having a somewhat larger diameter than apertures 36 (i.e., able to accept coated optical fibers). As shown in FIG. 11, the same precision output element 34 can be used in this embodiment to provide the necessary precision (pitch and pointing) for the 2D fiber array assembly.

The formation of through-holes 92 directly in mounting flange 90 eliminates the need for a separate fiber guide block, but at the cost of increasing the size and fabrication complexity of the mounting flange. A precision loading tool is again used to introduce 1×N fiber arrays (pre-aligned) into the structure.

Figure 12:
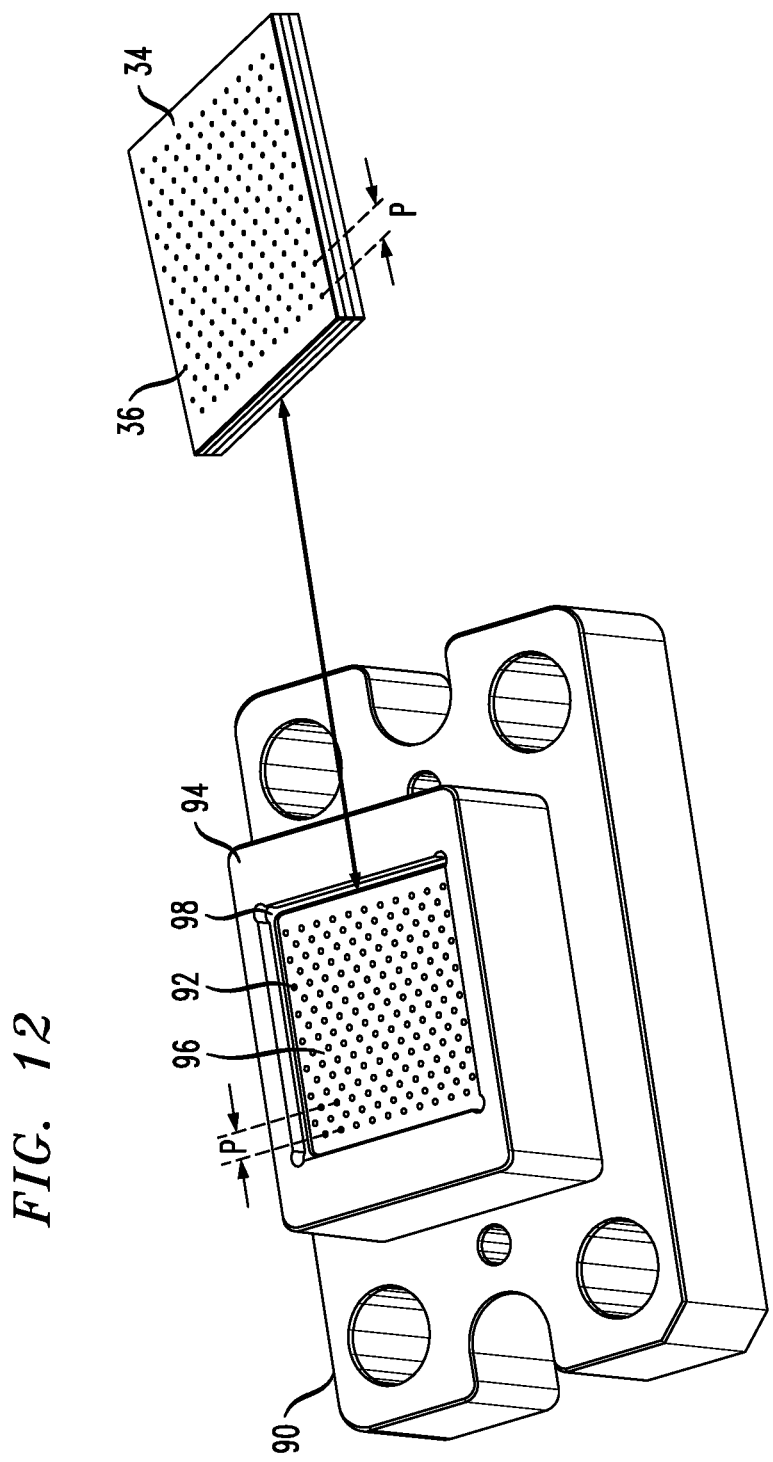
FIG. 12 is a view of a top surface of the mounting flange shown in FIG. 11, including an exemplary output element that mates with the top surface.

FIG. 12 is an isometric view of output element 34 and mounting flange 90, with this view illustrating an exemplary preferred configuration of mounting flange 90 for supporting output element 34. As shown, mounting flange 90 is formed to include a recessed central region 96 which is sized to support output element 34 in a manner whereby output element 34 is in alignment with through-holes 92. Also shown in this view is a landing ridge (also referred to as a "shoulder") 98 upon which output element 34 is positioned and affixed. As discussed below, the thickness of ridge 98 can be controlled to provide the desired gap spacing g between surface 94 (i.e., the exit surface of the fibers from the housing element) and bottom layer 50 (for example) of a silicon-based output element 34.

Figure 13:
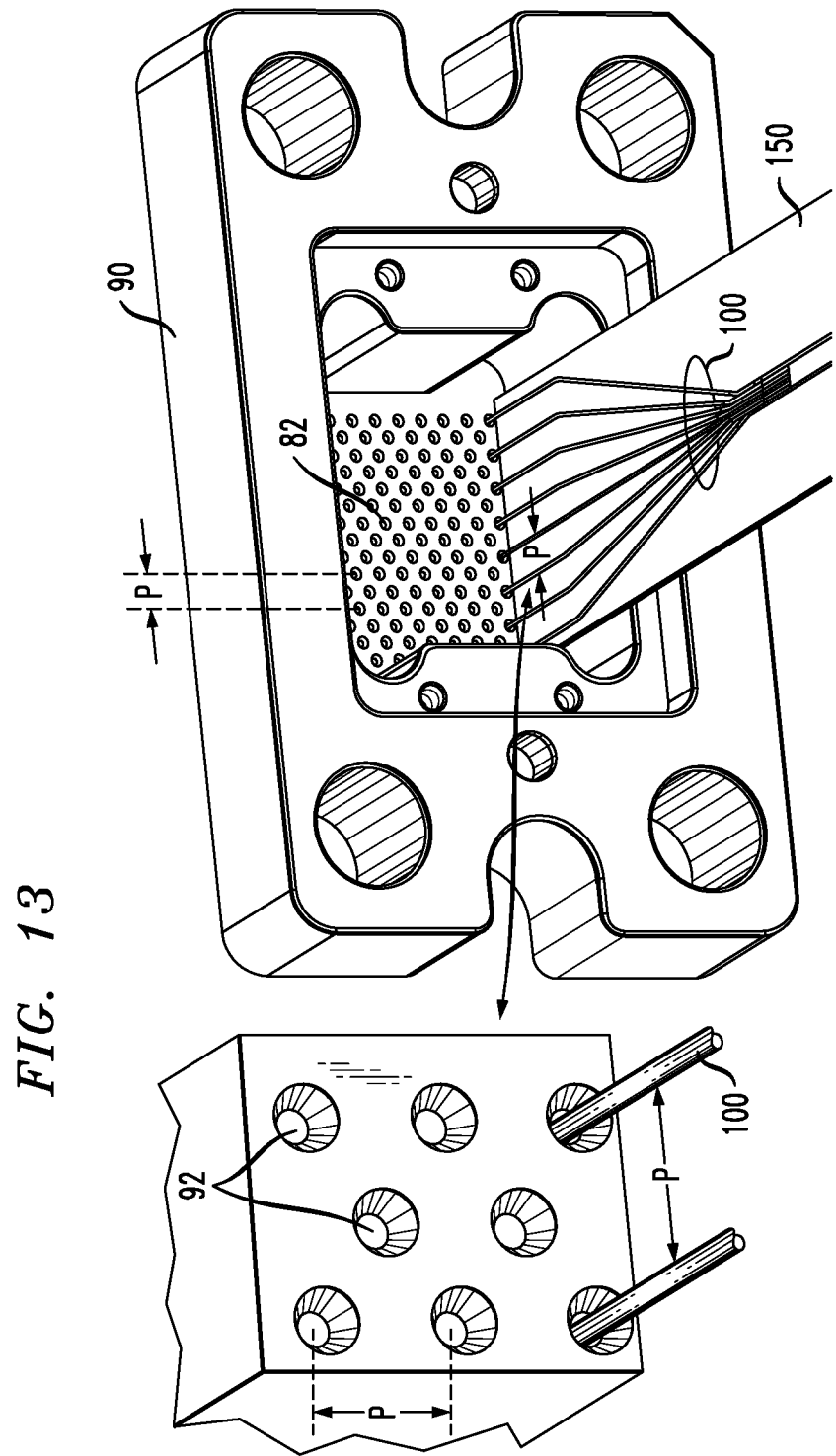
FIG. 13 is an isometric view of the rear (entrance) face of the mounting flange as shown in FIG. 11, illustrating a process for loading 1×N fiber arrays into the through-holes formed directly in the mounting flange.

FIG. 13 is a rear isometric view mounting flange 90, illustrating one exemplary technique for loading a 1×N fiber array 100 into an associated array of through-holes 92 (a close-up view of the insertion of exemplary fibers through associated through-holes is also shown). Here, an exemplary tool 150 is used to support a plurality of N fibers in a linear array, with the pre-determined pitch P created between adjacent fibers. Once the fibers are loaded onto tool 150 (and affixed in their "pre-aligned," position), tool 150 directs the array into the relatively large-sized lead-in end openings 92-O of through-holes 82. Once loaded, the 1×N array of fibers is bonded in place (on the backside of mounting flange 90), and another plurality of N fibers is loaded onto tool 150.

As mentioned above, a significant aspect of the present invention is the ability to utilize a precision tool to hold a 1×N array of fibers in a pre-aligned spacing (i.e., with the pre-defined pitch) as the fibers are loaded into the invention 2D fiber array component. The utilization of a precision tool substantially reduces the accuracy required in the formation of the through-holes in the fiber guide block, and yet allows for the desired pitch and pointing error requirements to be met (if not exceeded). Since the tool can be used over and over again, its cost is not embedded in the components of the final assembly, allowing for a relatively inexpensive 2D fiber array component to be formed.

Figure 14:
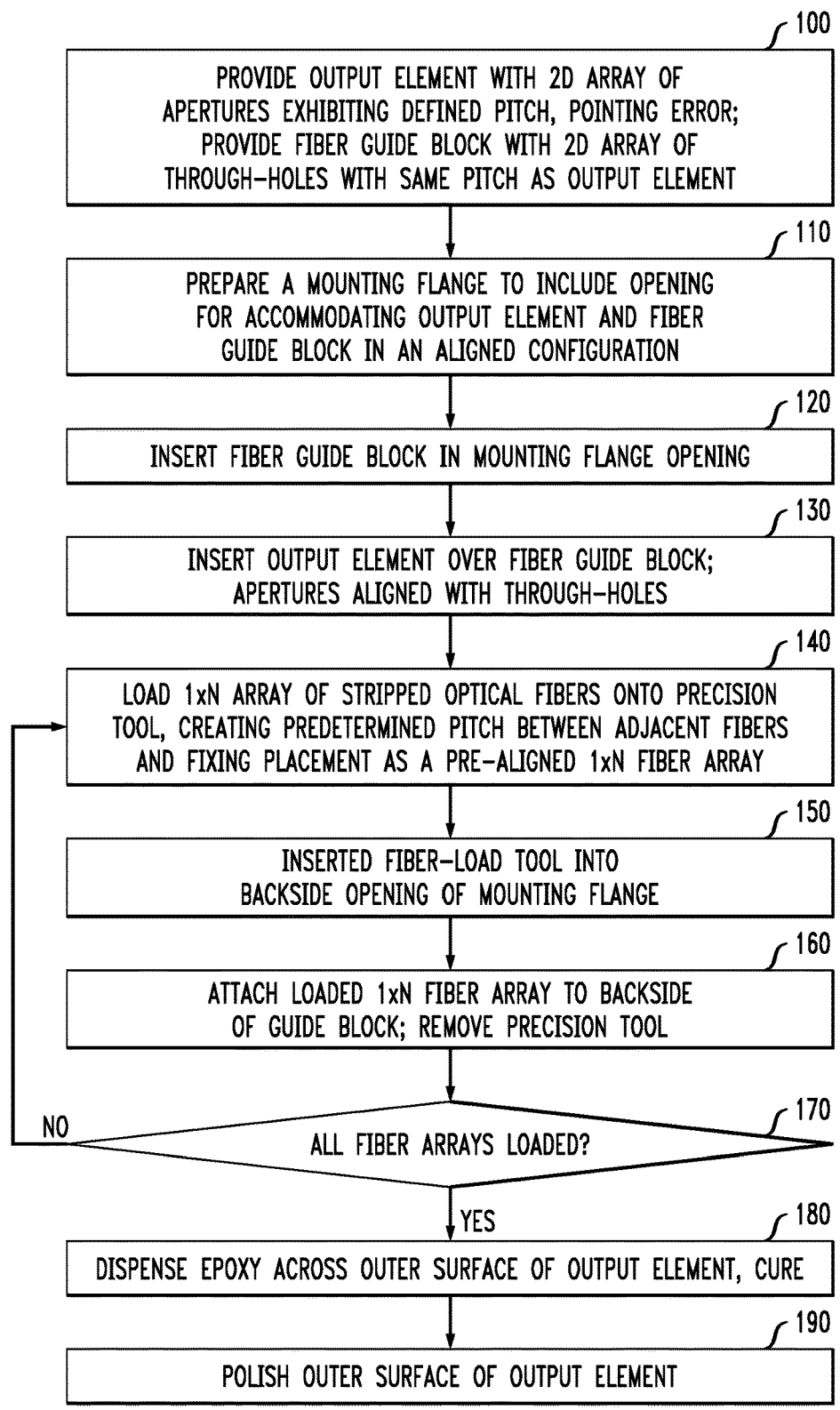
FIG. 14 is a flowchart illustrating an exemplary method for assembly a 2D fiber array component formed in accordance with the present invention.

A flow chart of an exemplary process useful in assembly a 2D fiber array component of the present invention is shown in FIG. 14. As shown, the process begins at step 100 with providing a suitable precision output element that has been manufactured in accordance with pre-defined pitch and pointing error requirements. A fiber guide block is also provided at this step, with the block having apertures of the same pitch as the output element, but with slightly larger diameter openings (i.e., able to accept a coated fiber as opposed to the stripped fiber end terminations passing through the output element).

Next, a mounting flange is prepared (step 110) to include an opening for holding the fiber guide block and output element in a mechanically secure, aligned manner. Following this, the fiber guide block is inserted in the mounting flange (step 120), and the output element is inserted over the fiber guide block in the mounting flange (step 130).

At this point in the process, shown as step 140, a plurality of N optical fibers having stripped end terminations is loaded on a precision tool that positions the fibers with the desired pitch (i.e., the same pitch as the output element). The precision tool is then inserted through the backside of the mounting flange (step 150), with the pre-aligned fibers passing through the fiber guide block and output element. The stripped end terminations of the fibers will be visible through the apertures formed in the output element.

Once loaded, an epoxy (or other suitable bonding material) is applied to the backside of the fiber guide block to hold the loaded 1×N array of fibers in place. This is shown as step 160. The precision tool is removed once the fibers are fixed in place. At this point in the process, a check is made (step 170) to see of all of the 1×N fiber arrays have been loaded in the 2D fiber array component. Presuming there are still other 1×N fiber arrays to be loaded, the process returns to step 140, where a new set of stripped fibers is loaded onto the precision tool.

At the point in the process where all of the 1×N fiber arrays have been loaded, another epoxy (or bonding) process is used (step 180) to affix the protruding end terminations 100E of fibers in place with respect to the output element. Once the bonding is fully cured, a final polishing operation can be performed on the output surface (step 190).

While the above discussion describes exemplary embodiments and assembly methods for a 2D fiber array component, it is to be understood that there are various alternatives that may occur to those skilled in the art. Various materials may be utilized in the formation of each of the elements forming the component, for example. These alternatives are considered to fall within the scope of the present invention, which is limited only by the scope of the claims appended hereto.

What is claimed is:

1. A two-dimensional (2D) array component for supporting a plurality of individual optical fibers in a 2D configuration exhibiting a predetermined pitch, the array component comprising:

a non-precision fiber guide block including a plurality of through-holes arranged in a 2D array configuration exhibiting the predetermined pitch, the plurality of through-holes formed to guide fibers passing therethrough and reduce pointing error, with each through-hole having a first diameter sufficient to accommodate a coated optical fiber;

a silicon-based output element including a plurality of vias etched through a thickness of the silicon-based output element, the plurality of etched vias arranged in the 2D array configuration exhibiting the predetermined pitch, each etched via having a second diameter less than the first diameter, the second diameter on the order of a cladded optical fiber; and a mounting flange for supporting the fiber guide block and the silicon-based output element in an aligned configuration such that the 2D array component exhibits a pitch error no greater than ±1 µm and a pointing error no greater than ±15 mrad.

2. The 2D array component as defined in claim 1 wherein the silicon-based output element comprises a multilayer structure of multiple silicon layers.

3. The 2D array component as defined in claim 2 wherein the multilayer structure silicon-based output element comprises an output silicon layer including a first plurality of etched vias arranged in the 2D array configuration exhibiting the predetermined pitch, each etched via formed to exhibit the first diameter; and an input silicon layer including a second plurality of etched vias arranged in the 2D array configuration, the input silicon layer positioned in alignment with the output silicon layer such that the second plurality of etched vias aligns with the first plurality of etched vias.

4. The 2D array component as defined in claim 3 wherein each etched via of the first and second pluralities of etched vias includes a larger lead-in opening to facilitate the insertion of optical fibers.

5. The 2D array component as defined in claim 3 wherein the multilayer structure silicon-based output element further comprises a silicon spacer disposed between the output and input silicon layers, the silicon spacer including a plurality of relief holes disposed in a 2D array pattern that aligns with the first and second pluralities of etched vias formed in the output and input silicon layers.

6. The 2D array component as defined in claim 5 wherein the silicon spacer is formed to have a thickness t selected to minimize pointing error in the 2D array component.

7. The 2D array component as defined in claim 3 wherein the diameter of the etched vias formed in the input silicon layer is greater than the first diameter associated with the etched vias formed in the output silicon layer.

8. The 2D array component as defined in claim 1 wherein the mounting flange includes a central sleeve for engaging the fiber guide block and the silicon-based output element, the central sleeve including a first shoulder rim for supporting the fiber guide block and a second shoulder rim for supporting the silicon-based output element with a pre-defined gap spacing g between the first and second shoulder rims.

9. The 2D array component as defined in claim 1 wherein the non-precision fiber guide block is formed of a plastic material.

10. The 2D array component as defined in claim 9 wherein the non-precision fiber guide block comprises a molded plastic material component.

* * * * *